(12) United States Patent
Horiuchi et al.

(10) Patent No.: US 10,551,511 B2
(45) Date of Patent: Feb. 4, 2020

(54) RADIATION DETECTION DEVICE

(71) Applicant: FUJIFILM Corporation, Tokyo (JP)

(72) Inventors: Hisatsugu Horiuchi, Kanagawa (JP);
Masateru Tateishi, Kanagawa (JP);
Shinsuke Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/204,699

(22) Filed: Nov. 29, 2018

(65) Prior Publication Data

US 2019/0196027 A1 Jun. 27, 2019

(30) Foreign Application Priority Data

Dec. 22, 2017 (JP) .................. 2017-246653

(51) Int. Cl.
*G01T 1/20* (2006.01)
(52) U.S. Cl.
CPC ...................... *G01T 1/20* (2013.01)
(58) Field of Classification Search
CPC ......... G01T 1/2018; G01T 1/20; G01T 1/175; G01T 1/247
See application file for complete search history.

(56) References Cited

U.S. PATENT DOCUMENTS

| | | | |
|---|---|---|---|
| 2012/0019064 A1* | 1/2012 | Caruba | G01R 33/481 307/18 |
| 2015/0253436 A1* | 9/2015 | Eguchi | G01T 1/2018 250/361 R |

FOREIGN PATENT DOCUMENTS

JP 2007-226834 A 9/2007

\* cited by examiner

*Primary Examiner* — David P Porta
*Assistant Examiner* — Fani Boosalis
(74) *Attorney, Agent, or Firm* — Birch, Stewart, Kolasch & Birch, LLP (57) ABSTRACT

A radiation detection device includes: a radiation detection panel; a supporting member having a first surface on which the radiation detection panel is provided; plural power supply units that are bonded to a second surface of the supporting member opposite to the first surface of the supporting member; a housing that accommodates the radiation detection panel, the supporting member, and the plural power supply units; and plural spacers that are provided on the second surface so as to protrude more than the plural power supply units and contact with a bottom of the housing which faces the second surface, the plural power supply units include a first power supply unit and a second power supply unit that are arranged at an interval in a first direction in the second surface, and the plural spacers are as defined herein.

20 Claims, 5 Drawing Sheets

RADIATION DETECTION DEVICE

CROSS-REFERENCE TO RELATED APPLICATIONS

This application claims the benefit of Japanese Patent Application JP 2017-246653, filed Dec. 22, 2017, the entire content of which is hereby incorporated by reference, the same as if set forth at length.

BACKGROUND OF THE INVENTION

1. Field of the Invention

The present invention relates to a radiation detection device.

2. Description of the Related Art

A so-called flat panel detector (FPD) is used to acquire a radiographic image of an object. The FPD comprises, for example, a scintillator that emits fluorescence corresponding to the amount of incident radiation and a detection substrate on which pixels detecting the fluorescence emitted from the scintillator are two-dimensionally arranged. Radiation transmitted through the object is incident on the scintillator and each pixel converts the fluorescence generated from the scintillator into an electric signal. Radiographic image data of the object is generated on the basis of the electric signal output from each pixel.

In addition, a so-called electronic cassette which is portable and in which an FPD and a battery supplying power to the FPD are accommodated in a housing has been known as a radiation detection device comprising an FPD (for example, see JP2007-226834A).

The radiographic image detection device disclosed in JP2007-226834A comprises a detector panel that is an FPD, a rechargeable battery that supplies power to the detector panel, a base having one surface to which the detector panel is attached and the other surface to which the rechargeable battery is attached, and a housing that accommodates the detector panel, the rechargeable battery, and the base.

SUMMARY OF THE INVENTION

For example, an electronic cassette is inserted between the bed and an object that lies on his or her side on the bed and is then used. The load of the object is applied to the electronic cassette. The housing and the FPD accommodated in the housing are deformed due to the load applied to the electronic cassette. As a result, there is a concern that the FPD will be damaged.

In the radiographic image detection device disclosed in JP2007-226834A, one rechargeable battery is provided in a central portion of the base or two rechargeable batteries are provided on the diagonal lines of the base. A surface that is opposite to an attachment surface of the rechargeable battery to the base comes into contact with the bottom of the housing and the base is supported by the rechargeable battery. The rechargeable battery is generally strong and the attachment surface of the rechargeable battery is relatively wide. Since the base is supported by the rechargeable battery, the warpage of the base is prevented and the warpage of the FPD attached to the base is also prevented.

However, a contact region of the base which comes into contact with the attachment surface of the rechargeable battery is pressed against the attachment surface. Therefore, the slight warpage of the base including the contact region is limited and there is a concern that the base will be bent along the edge of the attachment surface. Even in a case in which two rechargeable batteries are provided on the diagonal lines of the base, the bending of the base in the outer periphery of the attachment surface of each rechargeable battery is not prevented. As a result, there is a concern that the FPD will be damaged.

The invention has been made in view of the above-mentioned problems and an object of the invention is to provide a radiation detection device that can prevent the damage of a radiation detection panel.

According to an aspect of the invention, there is provided a radiation detection device comprising: a radiation detection panel; a supporting member having a first surface on which the radiation detection panel is provided; a plurality of power supply units that are bonded to a second surface opposite to the first surface of the supporting member; a housing that accommodates the radiation detection panel, the supporting member, and the plurality of power supply units; and a plurality of spacers that are provided on the second surface so as to protrude from the plurality of power supply units and come into contact with a bottom of the housing which faces the second surface. The plurality of power supply units include a first power supply unit and a second power supply unit that are arranged at an interval in a first direction in the second surface. The plurality of spacers include a pair of spacers between which the first power supply unit and the second power supply unit are interposed in a second direction intersecting the first direction in the second surface and which extend in the first direction over both ends of each of the first power supply unit and the second power supply unit in the first direction. In a case in which the pair of spacers are viewed from the second direction, the pair of spacers continuously traverse the first power supply unit and the second power supply unit in the first direction.

According to an aspect of the invention, there is provided a radiation detection device comprising: a radiation detection panel; a supporting member having a first surface on which the radiation detection panel is provided; a plurality of power supply units that are bonded to a second surface opposite to the first surface of the supporting member; a housing that accommodates the radiation detection panel, the supporting member, and the plurality of power supply units; and a plurality of spacers that are provided on the second surface so as to protrude from the plurality of power supply units and come into contact with a bottom of the housing which faces the second surface. The plurality of power supply units include a first power supply unit and a second power supply unit that are arranged at an interval in a first direction in the second surface. The plurality of spacers include a pair of first spacers between which the first power supply unit is interposed in a second direction intersecting the first direction in the second surface and which extend in the first direction over both ends of the first power supply unit in the first direction and a pair of second spacers between which the second power supply unit is interposed in the second direction and which extend in the first direction over both ends of the second power supply unit in the first direction. In a case in which the pair of first spacers and the pair of second spacers are viewed from the second direction, at least one of the first spacers and at least one of the second spacers continuously traverse the first power supply unit and the second power supply unit in the first direction.

According to the invention, it is possible to provide a radiation detection device that can prevent the damage of a radiation detection panel.

DESCRIPTION OF THE PREFERRED EMBODIMENTS

Figure 1:
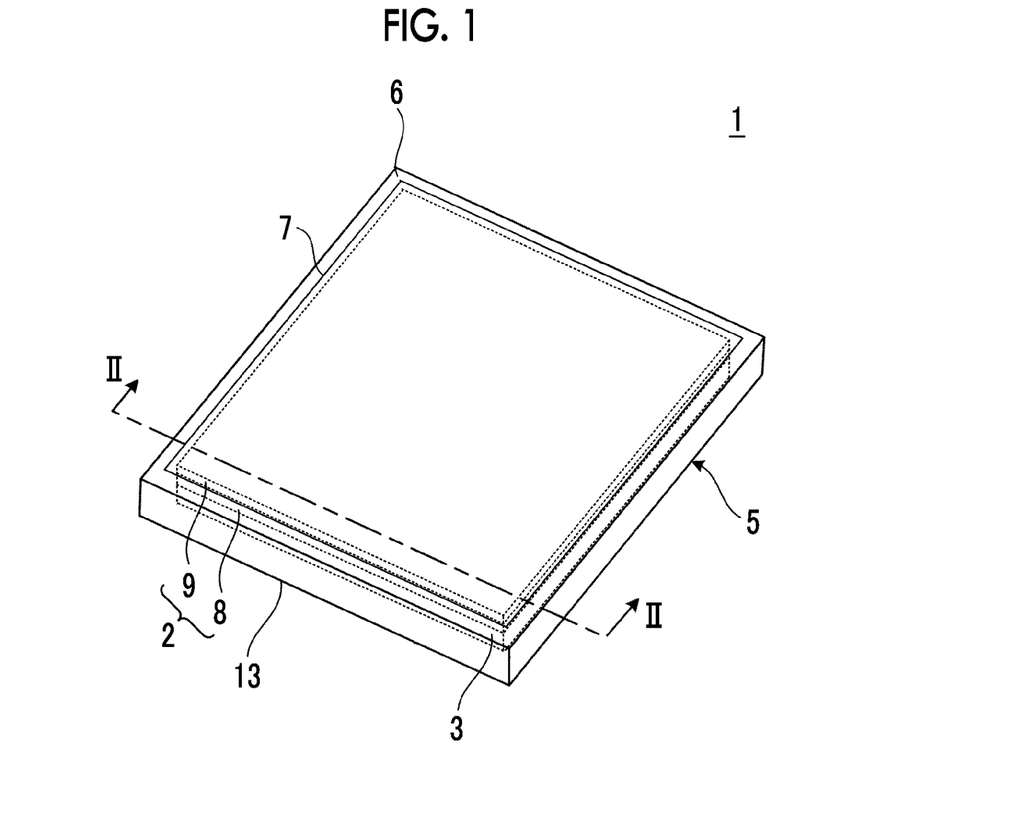
FIG. 1 is a perspective view illustrating an example of a radiation detection device for describing an embodiment of the invention.
Figure 2:
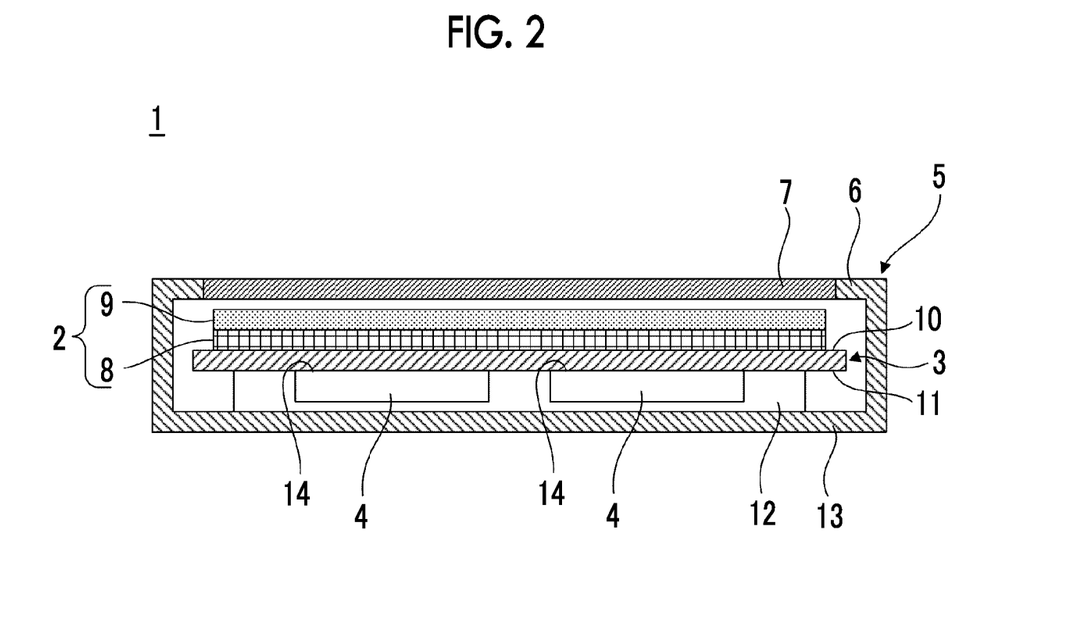
FIG. 2 is a cross-sectional view illustrating the radiation detection device taken along the line II-II of FIG. 1.

FIGS. 1 and 2 illustrate an example of a radiation detection device for describing an embodiment of the invention.

A radiation detection device 1 illustrated in FIGS. 1 and 2 is a so-called electronic cassette and comprises a radiation detection panel 2 that detects radiation, such as X-rays, a supporting member 3, a plurality of power supply units 4 that supply power to the radiation detection panel 2, and a housing 5 that accommodates the radiation detection panel 2, the supporting member 3, and the plurality of power supply units 4.

The housing 5 is formed in a rectangular parallelepiped shape and typically has a size based on the International Organization for Standardization (ISO) 4090:2001. It is preferable that the housing 5 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more. A rectangular opening is formed in a top plate 6 of the housing 5. A transmission plate 7 that transmits radiation is attached to the opening.

The radiation detection panel 2 includes a scintillator 8 and a detection substrate 9 and is provided behind the transmission plate 7 in the housing 5. The scintillator 8 has a phosphor, such as CsI:Tl (thallium-activated cesium iodide) or GOS ($Gd_2O_2S$:Tb, terbium-activated gadolinium oxysulfide), and emits fluorescence corresponding to the amount of incident radiation. The detection substrate 9 includes a plurality of pixels that are two-dimensionally arranged, detects fluorescence generated by the scintillator 8 with the pixels, and converts the detected fluorescence into an electric signal.

In this example, the scintillator 8 and the detection substrate 9 are stacked in the order of the scintillator 8 and the detection substrate 9 from the transmission plate 7 of the housing 5. However, the scintillator 8 and the detection substrate 9 may be stacked in the order of the detection substrate 9 and the scintillator 8 from the transmission plate 7. In addition, a direct-conversion-type radiation detection panel may be used in which a photoconductive film of each pixel of the detection substrate 9 that generates signal charge is made of, for example, amorphous selenium and which directly converts radiation into signal charge.

The supporting member 3 is a plate-shaped member and is formed in a rectangular shape. In the specification, the rectangular shape is not limited to a quadrangle with right-angled corners and includes a quadrangle with chamfered corners or a quadrangle with rounded corners. The supporting member 3 has a first surface 10 that faces the top plate 6 of the housing 5 and a second surface 11 that is opposite to the first surface 10. The radiation detection panel 2 is provided on the first surface 10 of the supporting member 3. In addition, the radiation detection panel 2 may be attached to the supporting member 3 or may be attached to the top plate 6 and the transmission plate 7 of the housing 5. It is preferable that the supporting member 3 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more.

The plurality of power supply units 4 are bonded to the second surface 11 of the supporting member 3. The power supply unit 4 is a rechargeable battery, such as a lithium-ion secondary battery, or a capacitor, such as an electric double layer capacitor or a lithium-ion capacitor. In addition, a circuit substrate is bonded to the second surface 11 of the supporting member 3, which is not illustrated in the drawings. For example, a driving control circuit that controls the driving of the detection substrate 9, a signal processing circuit that processes the electric signal output from the detection substrate 9, a communication circuit for communication with the outside, and a power circuit are formed on the circuit substrate. The plurality of power supply units 4 also supply power to the circuit substrate.

The radiation detection device 1 further comprises a plurality of spacers 12. The plurality of spacers 12 are provided on the second surface 11 of the supporting member 3 so as to protrude from the plurality of power supply units 4 and come into contact with a bottom 13 of the housing 5 which faces the second surface 11. There is a gap between the plurality of power supply units 4 and the bottom 13 of the housing 5. The supporting member 3 is not supported by the plurality of power supply units 4, but is supported by the plurality of spacers 12. A load applied to the top plate 6 of the housing 5 is transmitted to the bottom 13 of the housing 5 through the supporting member 3 and the plurality of spacers 12.

The plurality of spacers 12 may be formed integrally with the supporting member 3. In a case in which the supporting member 3 is made of a metal material, such as an aluminum alloy or a magnesium alloy, the plurality of spacers 12 can be formed integrally with the supporting member 3 by, for example, casting or forging. In a case in which the supporting member 3 is made of a resin material, such as a fiber reinforced resin, the plurality of spacers 12 can be formed integrally with the supporting member 3 by, for example, vacuum molding. In addition, the plurality of spacers 12 may be formed separately from the supporting member 3 and may be bonded to the supporting member 3. In this case, the material forming the spacers 12 is not particularly limited. The plurality of spacers 12 may be brought into contact with the bottom 13 of the housing 5 through a buffer material such as elastomer.

In the radiation detection device 1, the plurality of power supply units 4 are also used as a reinforcing member that increases the mechanical strength of the supporting member 3 and prevents the warpage of the supporting member 3. Preferably, a bonding surface 14 of each of the plurality of power supply units 4 to the second surface 11 of the supporting member 3 is entirely bonded to the second surface 11 in order to reinforce the supporting member 3. The bonding surface 14 and the second surface 11 are bonded to each other by an adhesive such as a double-sided tape. In addition, it is preferable that a case of each of the plurality of power supply units 4 is made of metal in order to reinforce the supporting member 3.

Figure 3:
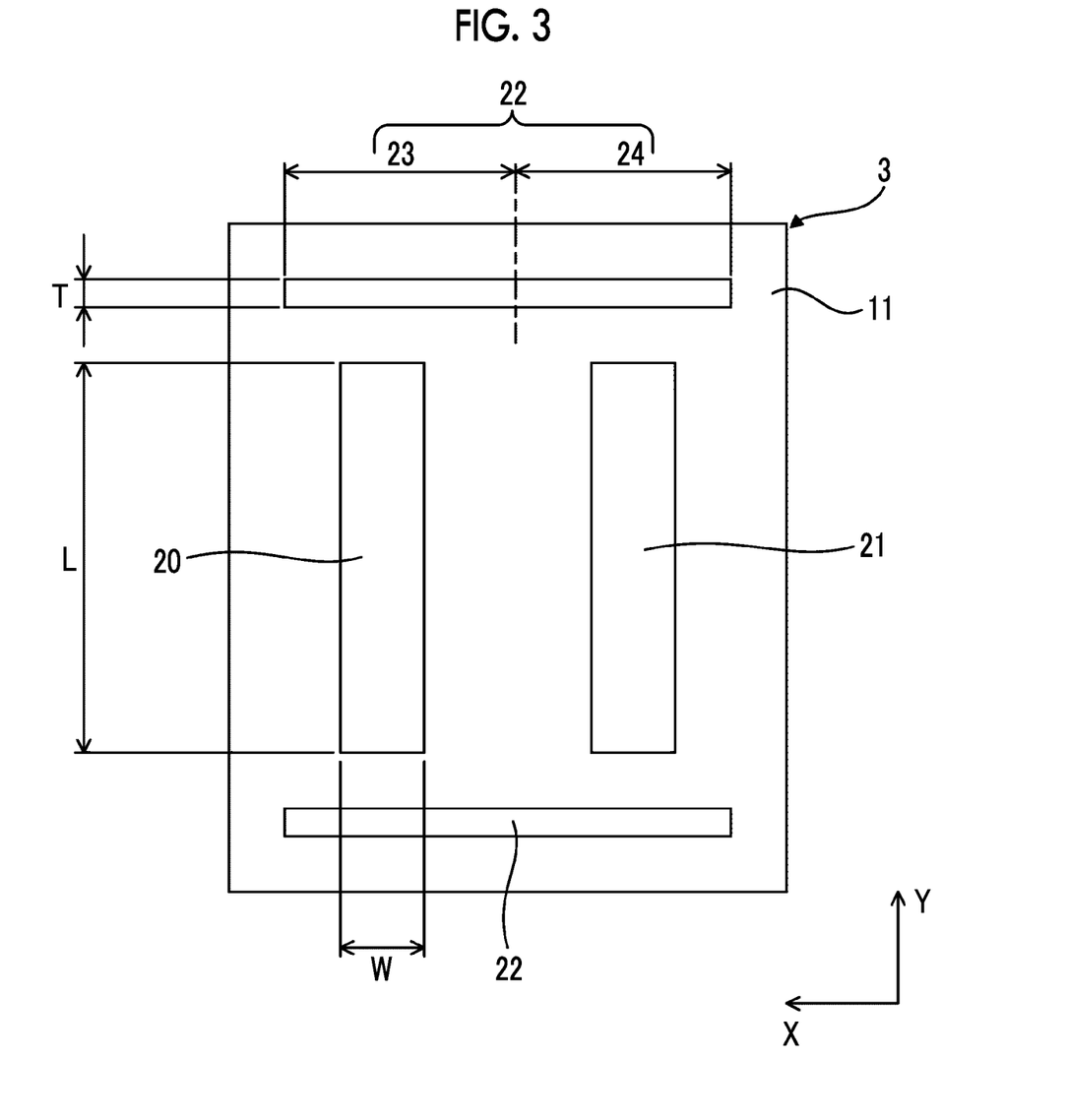
FIG. 3 is a plan view schematically illustrating an example of the installation of a plurality of power supply units and a plurality of spacers in the radiation detection device illustrated in FIG. 1.

FIG. 3 illustrates an example of the installation of the plurality of power supply units 4 and the plurality of spacers 12.

The plurality of power supply units 4 include a first power supply unit 20 and a second power supply unit 21 which are arranged at an interval in the first direction X in the second surface 11 of the supporting member 3.

As described above, the plurality of power supply units 4 are also used as reinforcing members that prevent the warpage of the supporting member 3. In the supporting member 3 formed in a rectangular shape, a long side is more likely to warp than a short side. In a case in which a direction along the short side of the second surface 11 of the rectangular supporting member 3 is a first direction X and a direction that intersects the first direction X in the second surface 11 and is along the long side of the second surface 11 is a second direction Y, preferably, each of the first power supply unit 20 and the second power supply unit 21 extends in the second direction Y and the dimension (length) L of the first power supply unit 20 and the second power supply unit 21 in the second direction Y is greater than the dimension (width) W thereof in the first direction X. Therefore, it is possible to effectively prevent the warpage of the supporting member 3.

The plurality of spacers 12 include a pair of spacers 22. The thickness T of the pair of spacers 22 is less than the length L and the width W of each of the first power supply unit 20 and the second power supply unit 21. The first power supply unit 20 is interposed between the pair of spacers 22 in the second direction Y and the pair of spacers 22 extend in the first direction X over both ends of the first power supply unit 20 in the first direction. In addition, the second power supply unit 21 is interposed between the pair of spacers 22 in the second direction Y and the pair of spacers 22 extend in the first direction X over both ends of the second power supply unit 21 in the first direction. That is, in a case in which the pair of spacers 22 are viewed from the second direction Y, the pair of spacers 22 continuously traverse the first power supply unit 20 and the second power supply unit 21 in the first direction X.

In other words, in a case in which the pair of spacers 22 are divided into a pair of first spacers 23 and a pair of second spacers 24 between the first power supply unit 20 and the second power supply unit 21, the first power supply unit 20 is interposed between the pair of first spacers 23 in the second direction Y and the pair of first spacers 23 extend in the first direction X over both ends of the first power supply unit 20 in the first direction. In addition, the second power supply unit 21 is interposed between the pair of second spacers 24 in the second direction Y and the pair of second spacers 24 extend in the first direction X over both ends of the second power supply unit 21 in the first direction. In the pair of first spacers 23 and the pair of second spacers 24, the spacers that are located on the same side with respect to the first power supply unit 20 and the second power supply unit 21 are integrally formed. The first spacer 23 and the second spacer 24 which are integrally formed continuously traverse the first power supply unit 20 and the second power supply unit 21 in the first direction X.

Since the pair of spacers 22 continuously traverse the first power supply unit 20 and the second power supply unit 21 in the first direction X, the supporting member 3 is prevented from being bent along the edge of the first power supply unit 20 close to the second power supply unit 21 and/or the edge of the second power supply unit 21 close to the first power supply unit 20. Therefore, it is possible to prevent the damage of the radiation detection panel 2.

In addition, the plurality of power supply units 4 may include a third power supply unit that is provided next to the first power supply unit 20 or the second power supply unit 21 at an interval in the first direction X. In this case, the first power supply unit 20, the second power supply unit 21, and the third power supply unit are interposed between the pair of spacers 22 in the second direction Y and the pair of spacers 22 extend in the first direction X over both ends of the third power supply unit in the first direction.

Figure 4:
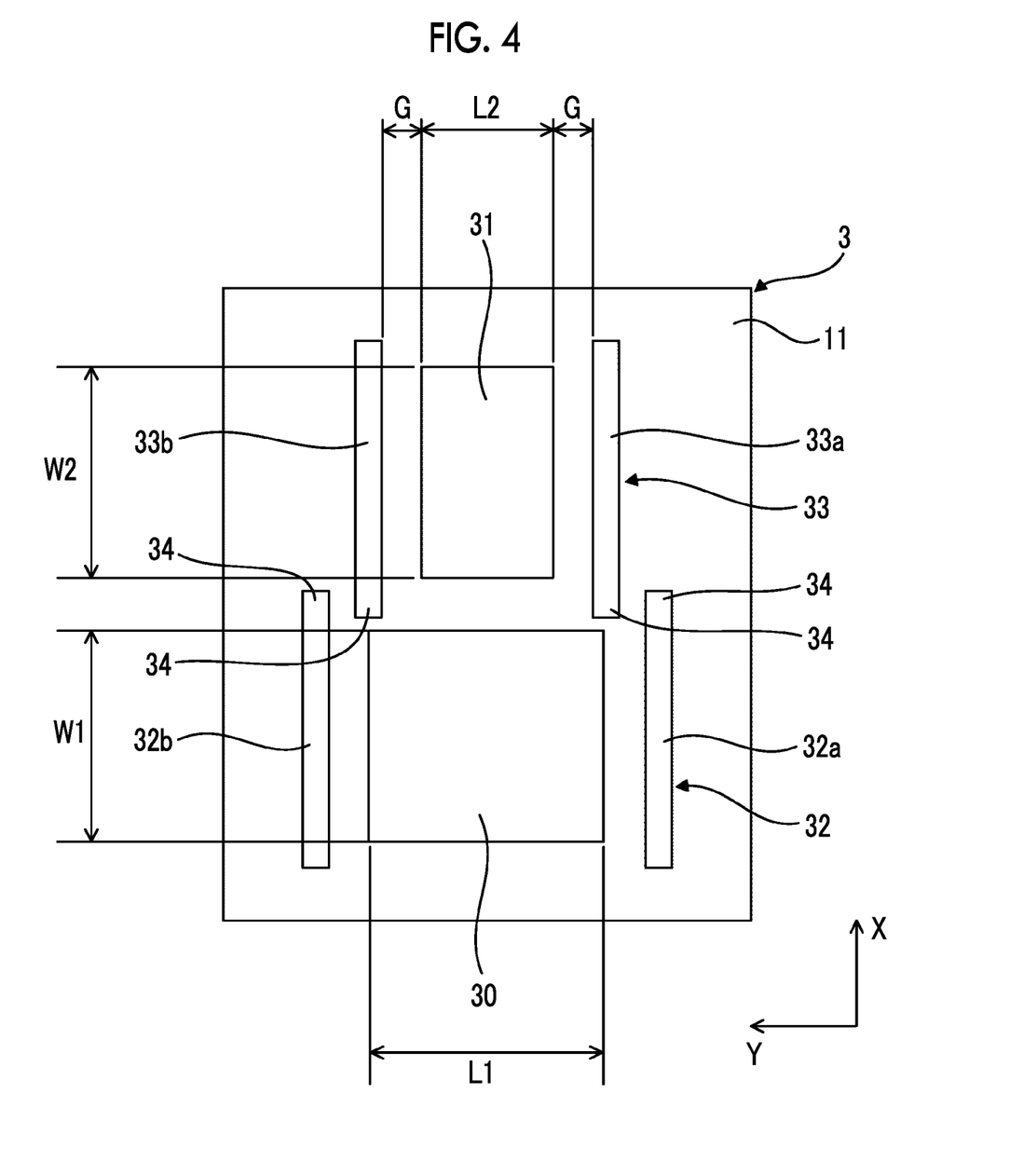
FIG. 4 is a plan view schematically illustrating another example of the installation of the plurality of power supply units and the plurality of spacers in the radiation detection device illustrated in FIG. 1.

FIG. 4 illustrates another example of the installation of the plurality of power supply units 4 and the plurality of spacers 12.

The plurality of power supply units 4 include a first power supply unit 30 and a second power supply unit 31 which are arranged at an interval in the first direction X in the second surface 11 of the supporting member 3. In the example illustrated in FIG. 4, a direction along the long side of the second surface 11 of the rectangular supporting member 3 is the first direction X and a direction which intersects the first direction X in the second surface 11 and is along the short side of the second surface 11 is the second direction Y.

In the example illustrated in FIG. 4, the dimension W1 of the first power supply unit 30 in the first direction X is equal to the dimension W2 of the second power supply unit 31 in the first direction X and the dimension L1 of the first power supply unit 30 in the second direction Y and the dimension L2 of the second power supply unit 31 in the second direction Y are different from each other and satisfy L1>L2. The second power supply unit 31 that is relatively small is, for example, a spare power supply unit. The first power supply unit 30 mainly supplies power to the radiation detection panel 2. For example, in a case in which the first power supply unit 30 is gone, the second power supply unit 31 supplies power to the radiation detection panel 2.

The plurality of spacers 12 include a pair of first spacers 32 (a spacer 32a and a spacer 32b) between which the first power supply unit 30 is interposed in the second direction Y and a pair of second spacers 33 (a spacer 33a and a spacer 33b) which are provided separately from the pair of first spacers 32 and between which the second power supply unit 31 is interposed in the second direction Y. The pair of first spacers 32 extend in the first direction X over both ends of the first power supply unit 30 in the first direction. The pair of second spacers 33 extend in the first direction X over both ends of the second power supply unit 31 in the first direction.

The pair of first spacers 32, between which the first power supply unit 30 that is relatively large is interposed, are provided outside the pair of second spacers, between which the second power supply unit 31 that is relatively small is interposed, in the second direction. That is, one spacer 32a of the pair of first spacers 32 and one spacer 33a, which is located on the same side as the spacer 32a with respect to the first power supply unit 30 and the second power supply unit 31, of the pair of second spacers 33 deviate from each other in the second direction Y. In addition, the other spacer 32b of the pair of first spacers 32 and the other spacer 33b of the pair of second spacers 33 deviate from each other in the second direction Y.

The spacer 32a and the spacer 33a have overlap portions 34 that overlap each other in the second direction Y. In a case in which the spacer 32a and the spacer 33a are viewed from the second direction Y, the spacer 32a and the spacer 33a continuously traverse the first power supply unit 30 and the second power supply unit 31 in the first direction X.

Since the spacer 32a and the spacer 33a continuously traverse the first power supply unit 30 and the second power supply unit 31 in the first direction X, the supporting member 3 is prevented from being bent along the edge of the first power supply unit 30 close to the second power supply unit 31 and/or the edge of the second power supply unit 31 close to the first power supply unit 30. Therefore, it is possible to prevent the damage of the radiation detection panel 2.

In the example illustrated in FIG. 4, the spacer 32b and the spacer 33b have the overlap portions 34 that overlap each other in the second direction Y. In addition, in a case in which the spacer 32b and the spacer 33b are viewed from the second direction Y, the spacer 32b and the spacer 33b continuously traverse the first power supply unit 30 and the second power supply unit 31 in the first direction X. Therefore, it is possible to further prevent the supporting member 3 from being bent along the edge of the first power supply unit 30 close to the second power supply unit 31 and/or the edge of the second power supply unit 31 close to the first power supply unit 30.

In addition, one spacer 32a of the pair of first spacers 32 and one spacer 33b, which is located on the side opposite to the spacer 32a with respect to the first power supply unit 30 and the second power supply unit 31, of the pair of second spacers 33 may have the overlap portions 34 that overlap each other in the second direction Y.

Preferably, the first power supply unit 30 that is relatively large is provided so as to overlap one gap G between one (the spacer 33a or the spacer 33b) of the pair of second spacers 33 and the second power supply unit 31 in the first direction X. More preferably, as illustrated in FIG. 4, the first power supply unit 30 is provided so as to overlap both gaps G between the pair of second spacers 33 (the spacer 33a and the spacer 33b) and the second power supply unit 31 in the first direction X. The warpage of the supporting member 3 in the gaps G can be prevented by the rigidity of the first power supply unit 30 as a reinforcing member.

Figure 5:
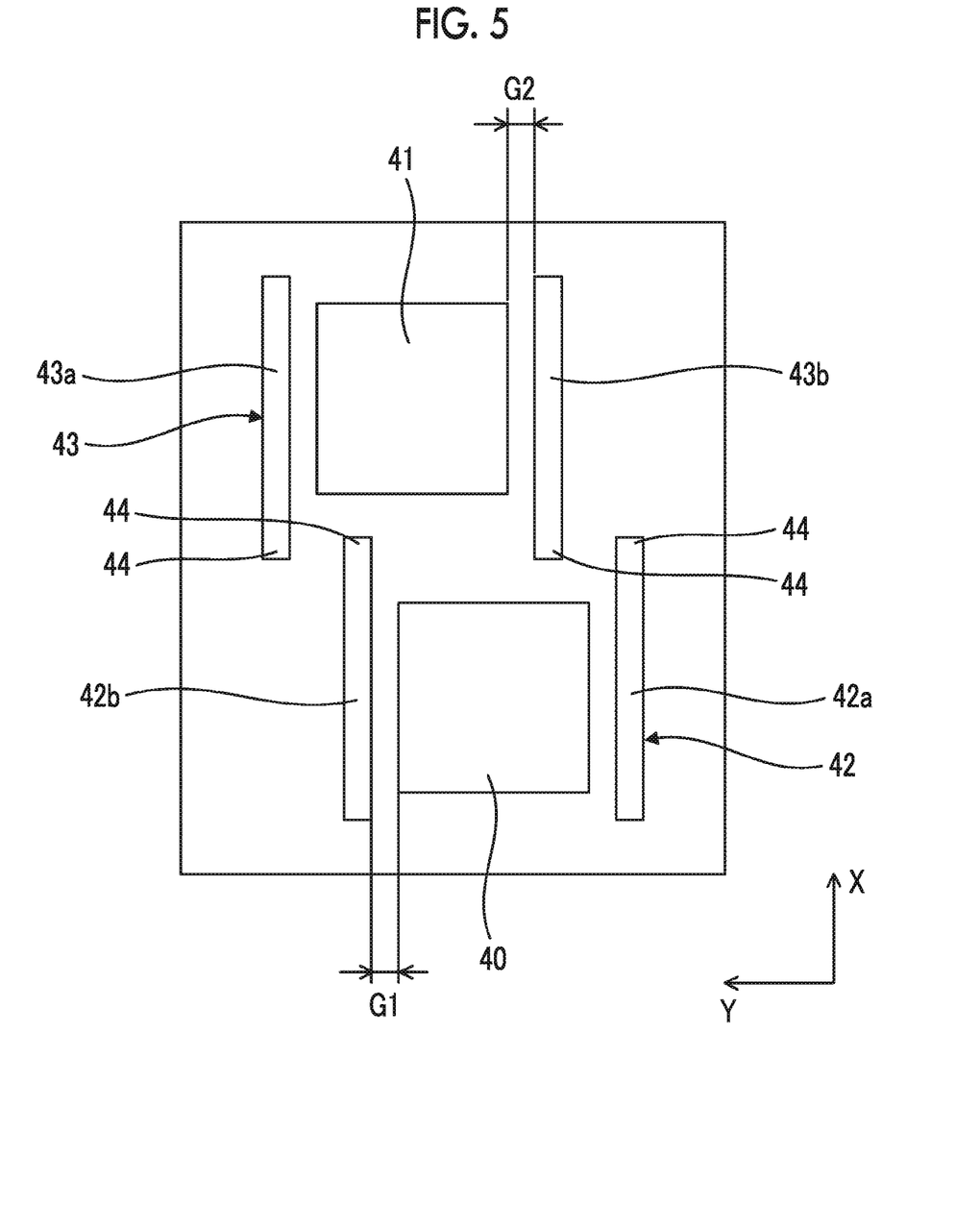
FIG. 5 is a plan view schematically illustrating still another example of the installation of the plurality of power supply units and the plurality of spacers in the radiation detection device illustrated in FIG. 1.

FIG. 5 illustrates still another example of the installation of the plurality of power supply units 4 and the plurality of spacers 12.

The plurality of power supply units 4 include a first power supply unit 40 and a second power supply unit 41 which are arranged at an interval in the first direction X in the second surface 11 of the supporting member 3. In the example illustrated in FIG. 5, the first power supply unit 40 and the second power supply unit 41 are provided so as to deviate from each other in the second direction Y in the second surface 11.

The plurality of spacers 12 include a pair of first spacers 42 (a spacer 42a and a spacer 42b) between which the first power supply unit 40 is interposed in the second direction Y and a pair of second spacers 43 (a spacer 43a and a spacer 43b) which are provided separately from the pair of first spacers 42 and between which the second power supply unit 41 is interposed in the second direction Y. The pair of first spacers 42 extend in the first direction X over both ends of the first power supply unit 40 in the first direction. The pair of second spacers 43 extend in the first direction X over both ends of the second power supply unit 41 in the first direction.

Since the first power supply unit 40 and the second power supply unit 41 deviate from each other in the second direction Y, the pair of first spacers 42 between which the first power supply unit 40 is interposed and the pair of second spacers 43 between which the second power supply unit 41 is interposed also deviate from each other in the second direction Y. One spacer 42a of the pair of first spacers 42 and one spacer 43a, which is located on the same side as the spacer 42a with respect to the first power supply unit 40 and the second power supply unit 41, of the pair of second spacers 43 deviate from each other in the second direction Y. In addition, the other spacer 42b of the pair of first spacers 42 and the other spacer 43b of the pair of second spacers 43 deviate from each other in the second direction Y.

One spacer 42a of the pair of first spacers 42 and one spacer 43a, which is located on the same side as the spacer 42a with respect to the first power supply unit 40 and the second power supply unit 41, of the pair of second spacers 43 have overlap portions 44 that overlap each other in the second direction Y. In a case in which the spacer 42a and the spacer 43a are viewed from the second direction Y, the spacer 42a and the spacer 43a continuously traverse the first power supply unit 40 and the second power supply unit 41 in the first direction X.

Since the spacer 42a and the spacer 43a continuously traverse the first power supply unit 40 and the second power supply unit 41 in the first direction X, the supporting member 3 is prevented from being bent along the edge of the first power supply unit 40 close to the second power supply unit 41 and/or the edge of the second power supply unit 41 close to the first power supply unit 40. Therefore, it is possible to prevent the damage of the radiation detection panel 2.

In the example illustrated in FIG. 5, the spacer 42b and the spacer 43b have the overlap portions 44 that overlap each other in the second direction Y. In addition, in a case in which the spacer 42b and the spacer 43b are viewed from the second direction Y, the spacer 42b and the spacer 43b continuously traverse the first power supply unit 40 and the second power supply unit 41 in the first direction X. Therefore, it is possible to further prevent the supporting member 3 from being bent along the edge of the first power supply unit 40 close to the second power supply unit 41 and/or the edge of the second power supply unit 41 close to the first power supply unit 40.

In addition, one spacer 42a of the pair of first spacers 42 and one spacer 43b, which is located on the side opposite to the spacer 42a with respect to the first power supply unit 40 and the second power supply unit 41, of the pair of second spacers 43 may have the overlap portions 44 that overlap each other in the second direction Y.

Preferably, the first power supply unit 40 is provided so as to overlap a gap G2 between one spacer 43a of the pair of second spacers 43 and the second power supply unit 41 in the first direction X and the second power supply unit 41 is provided so as to overlap a gap G1 between one spacer 42b of the pair of first spacers 42 and the first power supply unit 40 in the first direction X. The warpage of the supporting member 3 in the gap G1 can be prevented by the rigidity of the second power supply unit 41 as a reinforcing member.

The warpage of the supporting member 3 in the gap G2 can be prevented by the rigidity of the first power supply unit 40 as a reinforcing member.

Figure 6:
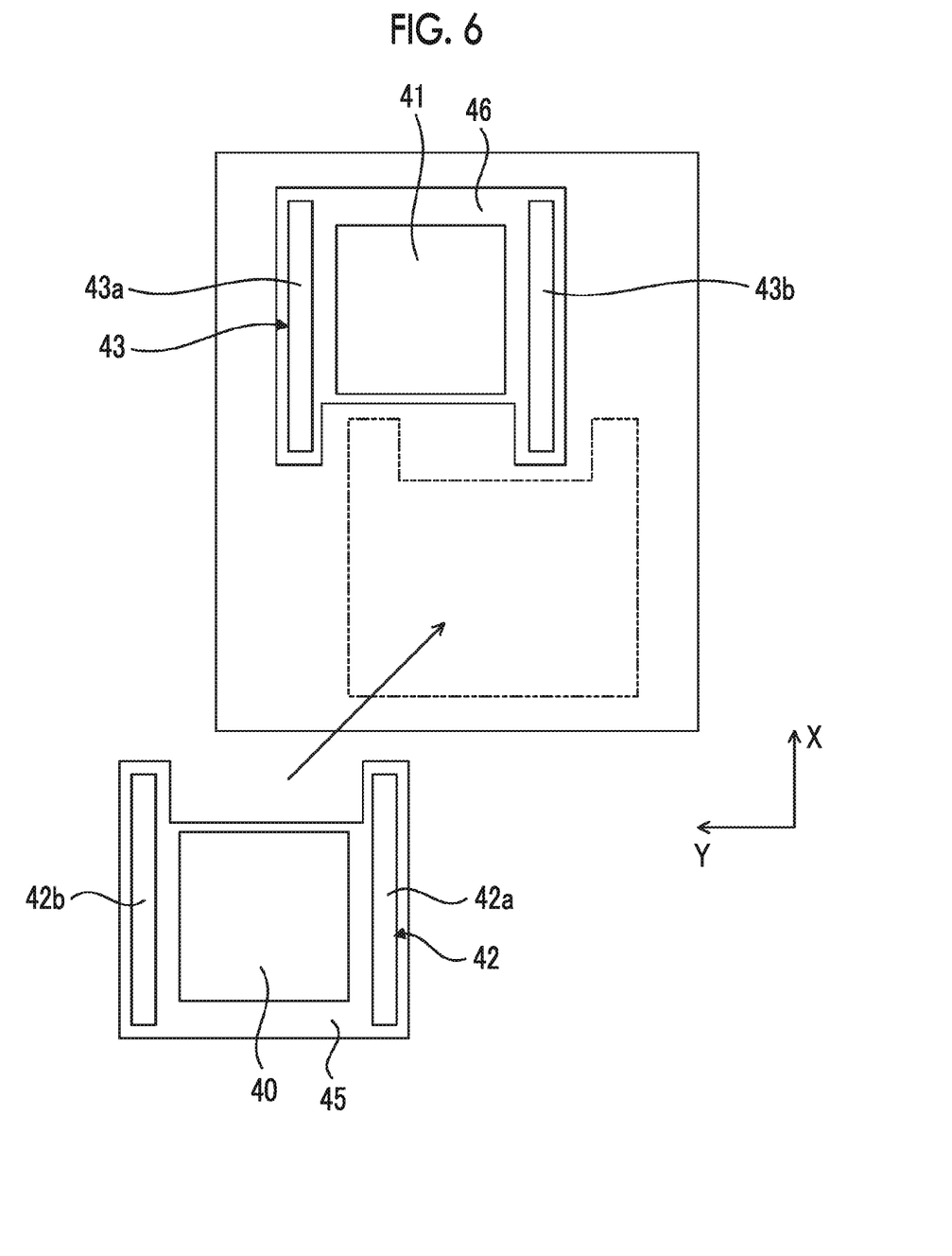
FIG. 6 is a plan view schematically illustrating a modification example of the radiation detection device illustrated in FIG. 1.

For example, in the example of the installation of the plurality of power supply units 4 and the plurality of spacers 12 illustrated in FIG. 5, the first power supply unit 40 and the pair of first spacers 42 may form a module that is integrally and detachably bonded to the second surface 11 of the supporting member 3 and the second power supply unit 41 and the pair of second spacers 43 may form a modules that is integrally and detachably bonded to the second surface 11 of the supporting member 3. In an example illustrated in FIG. 6, the first power supply unit 40 and the pair of first spacers 42 are bonded to a substrate 45 as a module and are integrally and detachably bonded to the second surface 11 of the supporting member 3 through the substrate 45. Similarly, the second power supply unit 41 and the pair of second spacers 43 are bonded to a substrate 46 to form a module.

As described above, a radiation detection device disclosed in the specification comprises: a radiation detection panel; a supporting member having a first surface on which the radiation detection panel is provided; a plurality of power supply units that are bonded to a second surface opposite to the first surface of the supporting member; a housing that accommodates the radiation detection panel, the supporting member, and the plurality of power supply units; and a plurality of spacers that are provided on the second surface so as to protrude from the plurality of power supply units and come into contact with a bottom of the housing which faces the second surface. The plurality of power supply units include a first power supply unit and a second power supply unit that are arranged at an interval in a first direction in the second surface. The plurality of spacers include a pair of spacers between which the first power supply unit and the second power supply unit are interposed in a second direction intersecting the first direction in the second surface and which extend in the first direction over both ends of each of the first power supply unit and the second power supply unit in the first direction. In a case in which the pair of spacers are viewed from the second direction, the pair of spacers continuously traverse the first power supply unit and the second power supply unit in the first direction.

As described above, a radiation detection device disclosed in the specification comprises: a radiation detection panel; a supporting member having a first surface on which the radiation detection panel is provided; a plurality of power supply units that are bonded to a second surface opposite to the first surface of the supporting member; a housing that accommodates the radiation detection panel, the supporting member, and the plurality of power supply units; and a plurality of spacers that are provided on the second surface so as to protrude from the plurality of power supply units and come into contact with a bottom of the housing which faces the second surface. The plurality of power supply units include a first power supply unit and a second power supply unit that are arranged at an interval in a first direction in the second surface. The plurality of spacers include a pair of first spacers between which the first power supply unit is interposed in a second direction intersecting the first direction in the second surface and which extend in the first direction over both ends of the first power supply unit in the first direction and a pair of second spacers between which the second power supply unit is interposed in the second direction and which extend in the first direction over both ends of the second power supply unit in the first direction. In a case in which the pair of first spacers and the pair of second spacers are viewed from the second direction, at least one of the first spacers and at least one of the second spacers continuously traverse the first power supply unit and the second power supply unit in the first direction.

In the radiation detection device disclosed in the specification, at least one first spacer and at least one second spacer deviate from each other in the second direction and include overlap portions that overlap each other in the second direction.

In the radiation detection device disclosed in the specification, a dimension of the first power supply unit in the second direction is greater than a dimension of the second power supply unit in the second direction.

In the radiation detection device disclosed in the specification, the first power supply unit is provided so as to overlap a gap between at least one of the pair of second spacers and the second power supply unit in the first direction.

In the radiation detection device disclosed in the specification, the first power supply unit and the second power supply unit deviate from each other in the second direction.

In the radiation detection device disclosed in the specification, the first power supply unit is provided so as to overlap a gap between one of the pair of second spacers and the second power supply unit in the first direction and the second power supply unit is provided so as to overlap a gap between one of the pair of first spacers and the first power supply unit in the first direction.

In the radiation detection device disclosed in the specification, the first power supply unit and the pair of first spacers form a module that is integrally and detachably bonded to the second surface and the second power supply unit and the pair of second spacers form a module that is integrally and detachably bonded to the second surface.

In the radiation detection device disclosed in the specification, a bonding surface of each of the plurality of power supply units to the second surface is entirely bonded to the second surface.

In the radiation detection device disclosed in the specification, a case of each of the plurality of power supply units is made of metal.

EXPLANATION OF REFERENCES

1: radiation detection device
2: radiation detection panel
3: supporting member
4: power supply unit
5: housing
6: top plate of housing
7: transmission plate
8: scintillator
9: detection substrate
10: first surface of supporting member
11: second surface of supporting member
12: spacer
13: bottom of housing
14: bonding surface of power supply unit
20: first power supply unit
21: second power supply unit
22: spacer
23: first spacer
24: second spacer
30: first power supply unit
31: second power supply unit
32: first spacer
32a: spacer
32b: spacer 33: second spacer
33a: spacer
33b: spacer
34: overlap portion
40: first power supply unit
41: second power supply unit
42: first spacer
42a: spacer
42b: spacer
43: second spacer
43a: spacer
43b: spacer
44: overlap portion
45: substrate
46: substrate
G: gap
G1: gap
G2: gap
L: dimension (length)
L1: dimension
L2: dimension
W: width
W: dimension (width)
W1: dimension
W2: dimension
X: first direction
Y: second direction

What is claimed is:

1. A radiation detection device comprising:
a radiation detection panel;
a supporting member having a first surface on which the radiation detection panel is provided;
a plurality of power supply units that are bonded to a second surface of the supporting member opposite to the first surface of the supporting member;
a housing that accommodates the radiation detection panel, the supporting member, and the plurality of power supply units; and
a plurality of spacers that are provided on the second surface so as to protrude more than the plurality of power supply units and contact with a bottom of the housing which faces the second surface,
wherein the plurality of power supply units comprise a first power supply unit and a second power supply unit that are arranged at an interval in a first direction in the second surface,
the plurality of spacers comprise a pair of spacers between which the first power supply unit and the second power supply unit are interposed in a second direction intersecting the first direction in the second surface and which extend in the first direction over both ends of each of the first power supply unit and the second power supply unit in the first direction, and
in a case in which the pair of spacers are viewed from the second direction, the pair of spacers continuously traverse the first power supply unit and the second power supply unit in the first direction.

2. The radiation detection device according to claim 1, wherein an entire area of a bonding surface of each of the plurality of power supply units to the second surface is bonded to the second surface.

3. The radiation detection device according to claim 1, wherein a case of each of the plurality of power supply units is made of metal.

4. A radiation detection device comprising:
a radiation detection panel;
a supporting member having a first surface on which the radiation detection panel is provided;
a plurality of power supply units that are bonded to a second surface of the supporting member opposite to the first surface of the supporting member;
a housing that accommodates the radiation detection panel, the supporting member, and the plurality of power supply units; and
a plurality of spacers that are provided on the second surface so as to protrude more than the plurality of power supply units and contact with a bottom of the housing which faces the second surface,
wherein the plurality of power supply units comprise a first power supply unit and a second power supply unit that are arranged at an interval in a first direction in the second surface,
the plurality of spacers comprise a pair of first spacers between which the first power supply unit is interposed in a second direction intersecting the first direction in the second surface and which extend in the first direction over both ends of the first power supply unit in the first direction and a pair of second spacers between which the second power supply unit is interposed in the second direction and which extend in the first direction over both ends of the second power supply unit in the first direction, and
in a case in which the pair of first spacers and the pair of second spacers are viewed from the second direction, at least one of the first spacers and at least one of the second spacers continuously traverse the first power supply unit and the second power supply unit in the first direction.

5. The radiation detection device according to claim 4, wherein at least one of the first spacers and at least one of the second spacers deviate from each other in the second direction and comprise overlap portions that overlap each other in the second direction.

6. The radiation detection device according to claim 5, wherein a dimension of the first power supply unit in the second direction is greater than a dimension of the second power supply unit in the second direction.

7. The radiation detection device according to claim 6, wherein the first power supply unit is provided so as to overlap, in the first direction, a gap between at least one of the pair of second spacers and the second power supply unit.

8. The radiation detection device according to claim 7, wherein the first power supply unit and the pair of first spacers form a module that is integrally and detachably bonded to the second surface, and
the second power supply unit and the pair of second spacers form a module that is integrally and detachably bonded to the second surface.

9. The radiation detection device according to claim 6, wherein the first power supply unit and the pair of first spacers form a module that is integrally and detachably bonded to the second surface, and
the second power supply unit and the pair of second spacers form a module that is integrally and detachably bonded to the second surface.

10. The radiation detection device according to claim 6, wherein a case of each of the plurality of power supply units is made of metal.

11. The radiation detection device according to claim 6, wherein an entire area of a bonding surface of each of the plurality of power supply units to the second surface is bonded to the second surface.

12. The radiation detection device according to claim 5, wherein the first power supply unit and the second power supply unit deviate from each other in the second direction.

13. The radiation detection device according to claim 12, wherein the first power supply unit is provided so as to overlap, in the first direction, a gap between one of the pair of second spacers and the second power supply unit, and the second power supply unit is provided so as to overlap, in the first direction, a gap between one of the pair of first spacers and the first power supply unit.

14. The radiation detection device according to claim 13, wherein the first power supply unit and the pair of first spacers form a module that is integrally and detachably bonded to the second surface, and the second power supply unit and the pair of second spacers form a module that is integrally and detachably bonded to the second surface.

15. The radiation detection device according to claim 12, wherein the first power supply unit and the pair of first spacers form a module that is integrally and detachably bonded to the second surface, and the second power supply unit and the pair of second spacers form a module that is integrally and detachably bonded to the second surface.

16. The radiation detection device according to claim 5, wherein the first power supply unit and the pair of first spacers form a module that is integrally and detachably bonded to the second surface, and the second power supply unit and the pair of second spacers form a module that is integrally and detachably bonded to the second surface.

17. The radiation detection device according to claim 5, wherein an entire area of a bonding surface of each of the plurality of power supply units to the second surface is bonded to the second surface.

18. The radiation detection device according to claim 5, wherein a case of each of the plurality of power supply units is made of metal.

19. The radiation detection device according to claim 4, wherein an entire area of a bonding surface of each of the plurality of power supply units to the second surface is bonded to the second surface.

20. The radiation detection device according to claim 4, wherein a case of each of the plurality of power supply units is made of metal.

* * * * *